US007100895B2

(12) United States Patent
Schürz et al.

(10) Patent No.: US 7,100,895 B2

(45) Date of Patent: Sep. 5, 2006

(54) TRAVEL-TRANSMITTING ELEMENT FOR AN INJECTION VALVE

(75) Inventors: Willibald Schürz, Pielenhofen (DE); Martin Simmet, Bad Abbach (DE); Hanspeter Zink, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 11/008,455

(22) Filed: Dec. 9, 2004

(65) Prior Publication Data

US 2005/0140072 A1 Jun. 30, 2005

Related U.S. Application Data

(63) Continuation of application No. PCT/DE03/01859, filed on Jun. 3, 2003.

(30) Foreign Application Priority Data

Jun. 10, 2002 (DE) ................................ 102 25 686

(51) Int. Cl.
*F16K 31/00* (2006.01)

(52) U.S. Cl. .......................... 251/335.3; 251/57; 92/42

(58) Field of Classification Search .................. 251/57, 251/129.06, 335.3; 92/34, 42, 44, 47, 103 F; 417/472, 473

See application file for complete search history.

(56) References Cited

U.S. PATENT DOCUMENTS 2,056,106 A * 9/1936 Kuhn .......................... 267/35
4,777,868 A * 10/1988 Larsson .......................... 92/42
4,858,439 A * 8/1989 Sawada et al. ............... 60/583
6,832,749 B1 * 12/2004 Schuerg et al. ........ 251/129.06

FOREIGN PATENT DOCUMENTS

| | | |
|---|---|---|
| DE | 19727992 | 1/1999 |
| DE | 19940294 | 3/2001 |
| DE | 10054017 | 5/2002 |
| DE | 19962177 | 7/2002 |
| FR | 1192901 | 10/1959 |

OTHER PUBLICATIONS

PCT International Search Report Application no. PCT/EP03/01859, 3 pages.

* cited by examiner

*Primary Examiner*—Edward K. Look
*Assistant Examiner*—John K. Fristoe, Jr.
(74) *Attorney, Agent, or Firm*—Baker Botts L.L.P.

(57) ABSTRACT

Disclosed is a travel-transmitting element for an injection valve, comprising a pressure-loaded storage chamber which is filled with a hydraulic fluid and a storage element that is provided with an elastomeric bellows-type member. In order to ensure sufficient steadiness of the rotational speed over the service life, the inventive elastomeric bellows-type member is provided with a stiffening element which ensures constant radial stiffness over the service life at least in some sections thereof.

20 Claims, 2 Drawing Sheets

TRAVEL-TRANSMITTING ELEMENT FOR AN INJECTION VALVE

CROSS-REFERENCE TO RELATED APPLICATION OR PRIORITY

This application is a continuation of co-pending International Application No. PCT/DE03/01859 filed Jun. 3, 2003, which designates the United States, and claims priority to German application number DE10225686.1 filed Jun. 10, 2002.

FIELD OF THE INVENTION

The present invention relates to a travel-transmitting element for an injection.

BACKGROUND OF THE INVENTION

Such an element is known from DE 199 62 177 A1, in which the travel-transmitting element has a pressure-loaded storage chamber area, the boundaries of which are elastically formed. Despite the different coefficients of thermal expansion that exist among the individual components within injection valves (e.g., ceramic, steel and hydraulic fluid), this thermal compensating element can make a positive tie between the individual components of an injection valve in the overall operating range; it is important to take into account among other things the steadiness of the rotational speed in respect of the travel-transmitting element. According to DE 199 62 177 A1 the storage chamber area is bounded by a sprung bellows arrangement made of metal. The first disadvantage of this is that metal bellows arrangements are costly to manufacture and therefore, relatively expensive. Since metal bellows are very stiff in the radial direction, volume compensation takes place in the axial direction. Metal bellows exhibit a linear spring characteristic during small displacements only. During larger displacements, such as can occur, for example, during an operating temperature variation, the bellows show marked hysteresis effects. Due to the settlement and hysteresis properties of the individual bellows, an additional spring element is necessary in order to ensure perpetuation of the storage chamber pressure and thereby, the ability to operate even at high engine speeds. Another disadvantage in the case of this metal bellows arrangement is that the dynamic characteristics can change during operation.

Alternatively, according to DE 199 62 177 A1 the storage chamber area with the elastically formed boundaries can also be made from elastomeric material. Volume compensation can then be achieved by radial movement of the bellows. In the axial direction, these elements are relatively soft, which is necessary in order for the actuator to generate sufficient travel. However, known elastomeric materials exhibit creep properties, and in the course of inevitable ageing, this leads to a loss of radial stiffness and in turn to an unwelcome loss of pressure in the storage chamber. Therefore, steadiness of the rotational speed would not be provided even in the case of an elastomeric bellows-type member.

SUMMARY OF THE INVENTION

The object of the invention is to provide a travel-transmitting element for an injection valve, ensuring sufficient steadiness of the rotational speed over the service life.

According to the invention, this object is achieved by means of a travel-transmitting element having an elastomeric bellows-type member with a stiffening element which ensures constant radial stiffness over the service life in at least some sections thereof. Then despite ageing of the elastomeric material, unwanted pressure loss over the service life is prevented by the elastic stiffening element. It is possible to provide a suitable additional element to generate the counter-force for an injection valve actuator, if necessary this element being one that is known from prior art.

The travel-transmitting element can be embodied in a particularly compact form if the stiffening element or at least some part thereof increases the axial stiffness of the elastomeric material to the smallest extent at the same time. Then at least a section of the elastomeric bellows-type member can provide both the storage element function and the actuator counter-force function at the same time. The stiffening element is optimally chosen so that it particularly compensates for the loss of radial stiffness due to ageing of the elastomeric material without increasing the axial stiffness of the storage element too greatly. If the stiffening element extends the full length of the elastomeric bellows-type member, the geometry of both the elastomeric bellows-type member and the stiffening element must be chosen with particular care to achieve the respective requirements of this compromise.

According to a preferred embodiment, it is proposed that the elastomeric bellows-type member, which is connected in series using spring technology, shall have a first section A and a second section B, the stiffening element being provided in the second section only. A suitable choice of geometry makes the first section A stiffer in the radial direction than the second section. The stiffening element makes the second section B stiffer in the axial direction than the first section A. The two sections A and B are connected in series in the axial direction so that the reciprocals of each axial stiffness are added together. When the actuator causes an overall displacement, the additional counter-force acting on the actuator is therefore, to a first approximation only, determined by the first section A with the lower stiffness. In addition, due to the lower radial stiffness of the second section B, and to a first approximation only, the existing volume of hydraulic fluid leads to a bellows-like movement in the second section B. Assigning the properties in both sections of the elastomeric bellows-type member therefore enables the properties of the travel-transmitting element to be set to their optimum.

According to the invention, in order to be able to provide a compact and sturdy travel-transmitting element or storage element, it is further possible for the stiffening element in the elastomeric bellows-type member, which is embodied in particular in the form of a sleeve, to be inserted by injection. This applies to an increased extent if a bottom plate and/or head plate are connected by means of extrusion technology to the elastomeric bellows-type member and the stiffening element to form a standard component.

The injection valve with travel-transmitting element to which the invention relates will be disclosed by means of a typical embodiment and figures described below.

DETAILED DESCRIPTION OF THE PREFERRED EMBODIMENTS

Figure 1:
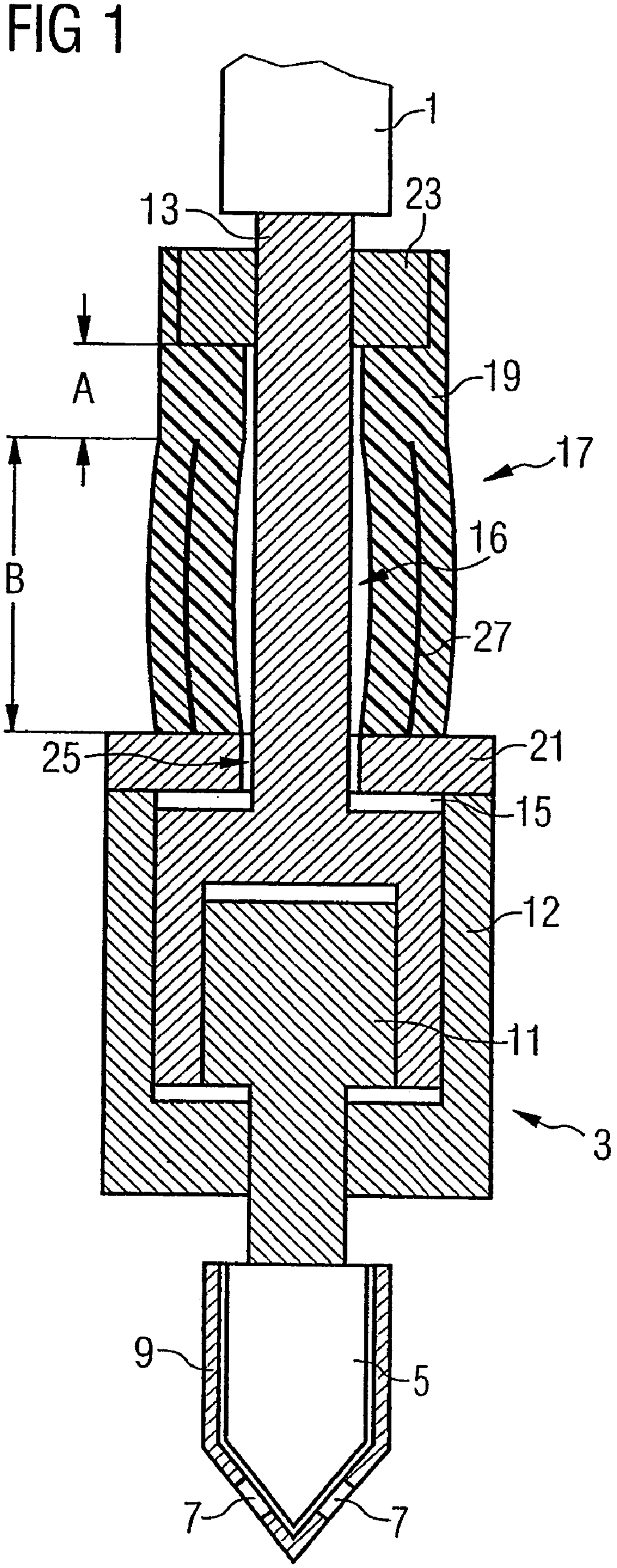
FIG. 1 shows a greatly simplified cross-section of an injection valve.

According to FIG. 1, an injection valve comprises an actuator 1 which uses a travel-transmitting element, having a hydraulic inverter 3 to control the movement of a valve needle 5, thereby controlling the fuel injection procedure. For this purpose, the valve needle 5 is moved in a known way within a valve needle housing 9 fitted with corresponding valve openings 7, so that the valve according to FIG. 1 opens inwards or outwards. A needle tappet 11 and a linked actuator tappet 13 are enclosed in a hydraulic fluid filled housing 12 of the hydraulic inverter 3. Movement of the actuator 1 is transmitted by the actuator tappet 13 to the needle tappet 11 and then to the valve needle 5. For the purpose of thermal volume compensation for the hydraulic fluid, the travel-transmitting element has a storage chamber 15 in the housing 12 as well as an ancillary storage chamber 16 formed within an ancillary elastic storage element 17. The elastic wall sections of the storage element 17 are provided by an elastomeric bellows-type member 19 which also provides the axial counter-force for the actuator 1. The elastomeric bellows-type member 19, which is shaped like a hollow cylinder, is tightly connected at the front end to both a bottom plate 21 and a head plate 23. The bottom plate 21 closes off the housing 12 of the hydraulic inverter 3 and has a corresponding opening for the actuator tappet 13. The head plate 23 is tightly connected at the actuator end to the actuator tappet 13. The annular space between the actuator tappet 13 and the inner wall of the elastomeric bellows-type member 19 thus forms the ancillary storage chamber 16 with the elastic wall sections. The ancillary storage chamber 16 has a suitably dimensioned annular space 25, formed in the region of the opening of the housing 12 between this and the actuator tappet 13, to which the storage chamber 15 formed in the housing 12 of the hydraulic inverter 3 is connected by fluid technology.

Figure 2:
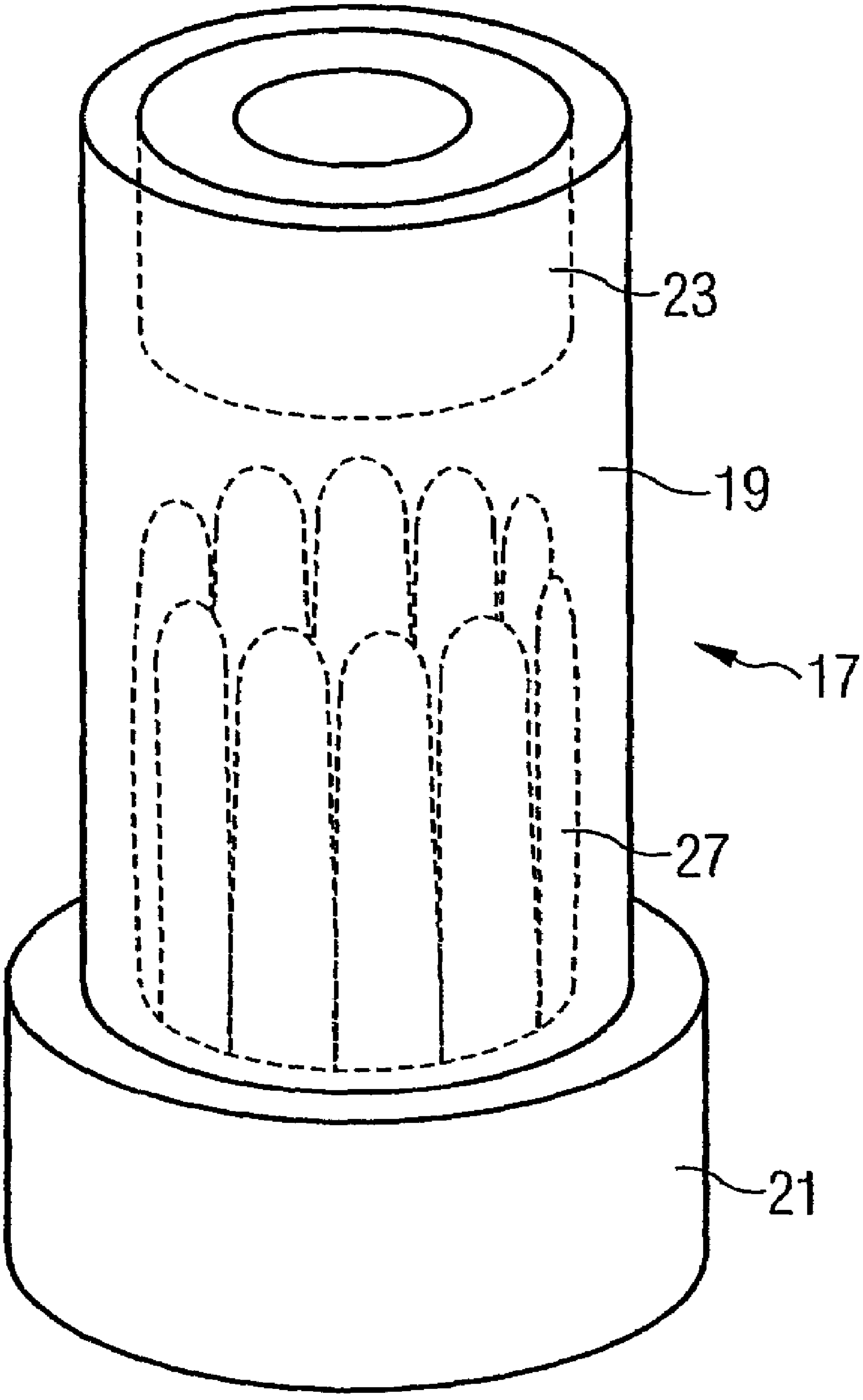
FIG. 2 shows an enlarged perspective representation of a storage element in the travel-transmitting element.

In the axial direction, the elastomeric bellows-type member 19 of the storage element 17 has a first section A and a second section B with different axial and radial elasticity properties. The two sections A, B provide different functions of the storage element 17 and are appropriately adjusted with respect to each other according to requirements. Arranged in the second section B of the elastomeric bellows-type member 19 is a stiffening element 27 formed by a sleeve-shaped metal net, for instance (FIG. 2). By this means, this section is radially softer than in the case of entirely metal bellows according to the known prior art, and in fact soft enough that the additional volume of the hydraulic fluid can be taken up in the storage element 17 without a sharp rise in pressure. This metal net 27 also ensures constant radial stiffness in the second section B of the elastomeric bellows-type member 19 despite creep in the elastomeric material over its service life. At the same time, the geometry of the elastomeric bellows-type member 19 in the first section A is chosen so that the lateral stiffness in the first section A is significantly greater than in the second section B despite not having a stiffening element. Therefore, any radial bellows action and/or associated pressure loss over the service life in the first section A is negligible and the steadiness of the rotational speed of the storage element is not negatively affected overall.

Due to the design of the radial stiffening element 27 according to FIG. 2, however, the elastomeric bellows-type member 19 in the second section B has increased axial stiffness which, if the section A were not present, would have a negative effect on the ability of the injection valve to operate. In the case of the known actuator types, the output travel actually decreases as the applied counter-force increases. The appropriate design of the axial stiffness in the first section A of the elastomeric bellows-type member 19, however, ensures that the actuator travel can be introduced into the transmission element 3 with negligible additional counter-force. Since the axial stiffness in the second section B is now no longer relevant to the function of the converter, its chosen value can be arbitrarily high and in particular can be optimal with reference to the requirements described above. The elastomer used in the section A is not strengthened, and its stiffness is set to axial optimum by the hardness of the material and by the geometry. However, as described above, the length of the section A must be chosen so that this section A is stiff enough in the radial direction to bulge only negligibly in the event of an increase in the hydraulic fluid volume.

In summary therefore, the hydraulic converter 3 and/or the storage element 17 are formed in such a way that on the one hand, due to the lower radial stiffness in the second section B, the additional volume of hydraulic fluid generated by a temperature change is provided without any noticeable increase in pressure, and therefore the dynamic properties of the injection valve change only imperceptibly in the operating temperature range from −40° C. to +150° C. On the other hand, due to the lower axial stiffness in the first section A, the actuator counter-force generated by the storage element 17 is suitably low. In this case the hardness of the elastomeric material is 70 to 85 ShoreA in accordance with DIN 53505. The stiffness of the elastomeric material is isotropic and therefore, directionally independent. However, due to space restrictions the elastomeric bellows-type member 19 is in the form of a sleeve, with the result that the length of the sleeve is significantly higher than its wall strength.

The entire elastomeric storage element 17 is produced in a vulcanizing process. For this purpose the head plate and the bottom plate 21, 23 together with the stiffening element 27 are inserted into a suitable injection mould and the hot material is injected. The cross-linking process takes place at a high temperature and pressure, so that all parts are connected firmly together and can be taken from the injection mould as a compact and sturdy standard component (not shown).

The travel-transmitting element according to the invention is suitable for use as a hydraulic compensator in different types of injection valves, in particular diesel injection valves or High Pressure Direct Injection (HPDJ) systems.

What we claim is:

1. A travel-transmitting element for an injection valve comprising: a pressure-loaded storage chamber filled with hydraulic fluid, a storage element having an elastomeric bellows-type member, and an injection valve actuator tappet in fluid communication with the storage chamber, wherein the elastomeric bellows-type member comprises a stiffening element to ensure radial stiffness in at least some sections thereof.

2. A travel-transmitting element according to claim 1, wherein the stiffening element or at least some part thereof minimally increases the axial stiffness of the elastomeric material.

3. A travel-transmitting element according to claim 2, wherein the elastomeric bellows-type member is formed in one piece.

4. A travel-transmitting element according to claim 2, wherein the elastomeric bellows-type member is connected in series using spring technology, and has a first section and a second section, the stiffening element being provided in the second section only.

5. A travel-transmitting element according to claim 1, wherein the elastomeric bellows-type member is formed in one piece.

6. A travel-transmitting element according to claim 5, wherein the elastomeric bellows-type member is connected in series using spring technology, and has a first section and a second section, the stiffening element being provided in the second section only.

7. A travel-transmitting element according to claim 1, wherein the elastomeric bellows-type member is connected in series using spring technology, and has a first section and a second section, the stiffening element being provided in the second section only.

8. A travel-transmitting element according to claim 7, wherein the second section is at least twice as long in the axial direction as the first section.

9. A travel-transmitting element according to claim 1, wherein the stiffening element is in the form of a sleeve-shaped metal net.

10. A travel-transmitting element according to claim 1, wherein the material of the elastomeric bellows-type member has a hardness of approximately 70 to 85 ShoreA.

11. A travel-transmitting element according to claim 1, wherein the stiffening element is injected into the elastomeric bellows-type member.

12. A travel-transmitting element according to claim 1, wherein a plate is connected by means of extrusion technology to the elastomeric bellows-type member and the stiffening element to form a standard component.

13. A travel-transmitting element according to claim 1, wherein the elastomeric bellows-type member is in the form of a sleeve.

14. A travel-transmitting element for an injection valve comprising:

a tappet housing, wherein at least a portion of the tappet housing comprises an elastomeric bellows-type member;

a hydraulic fluid within the tappet housing;

an actuator tappet fluidly communicating with the hydraulic fluid within the tappet housing; and a stiffening element in mechanical communication with the elastomeric bellow-type member to ensure radial stiffness in at least some sections thereof.

15. A travel-transmitting element according to claim 14, wherein the stiffening element or at least some part thereof minimally increases the axial stiffness of the elastomeric member, and wherein the elastomeric bellows-type member is formed with the stiffening element in one piece.

16. A travel-transmitting element according to claim 14, wherein the elastomeric bellows-type member comprises first and second sections that are connected in series using spring technology, and wherein the stiffening element is provided only in the second section.

17. A travel-transmitting element according to claim 14, wherein the stiffening element is in the form of a sleeve-shaped metal net.

18. A travel-transmitting element according to claim 14, wherein the material of the elastomeric bellows-type member has a hardness of approximately 70 to 85 ShoreA.

19. A travel-transmitting element according to claim 14, further comprising a plate connected by means of extrusion technology to the elastomeric bellows-type member and the stiffening element, wherein the elastomeric bellows-type member is in the form of a sleeve in one piece.

20. A travel-transmitting element according to claim 14, wherein the elastomeric bellows-type member comprises first and second sections connected in series using spring technology, and the stiffening element is provided in the second section only.

* * * * *